Nov. 1, 1938.    L. C. FISHER ET AL    2,134,753
DETACHABLE COLLECTOR
Original Filed Sept. 18, 1935    3 Sheets-Sheet 1

INVENTORS
Lyman C. Fisher
BY William H. Frank
Daniel G. Cullen
ATTORNEY.

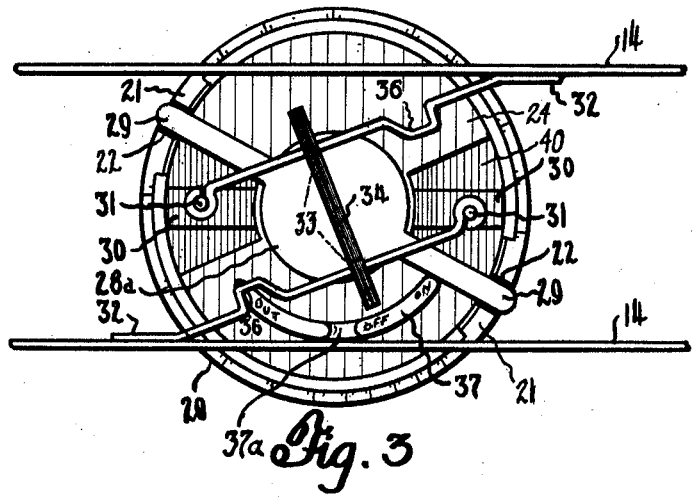
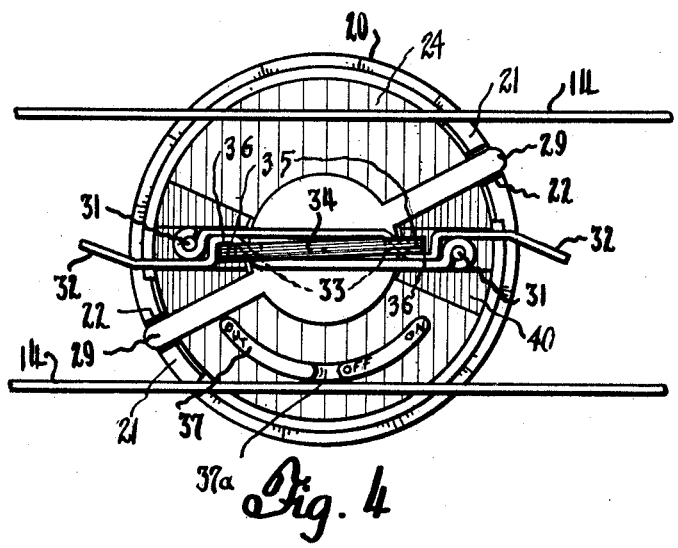

Nov. 1, 1938.　　　　L. C. FISHER ET AL　　　　2,134,753
DETACHABLE COLLECTOR
Original Filed Sept. 18, 1935　　3 Sheets-Sheet 3
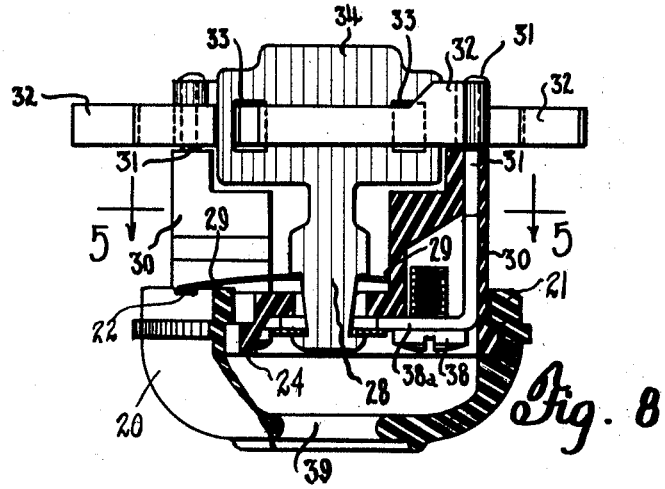
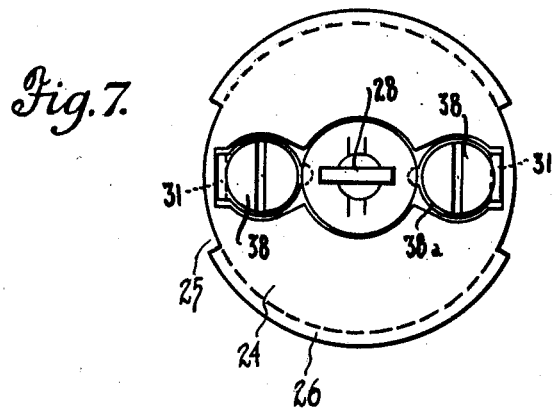
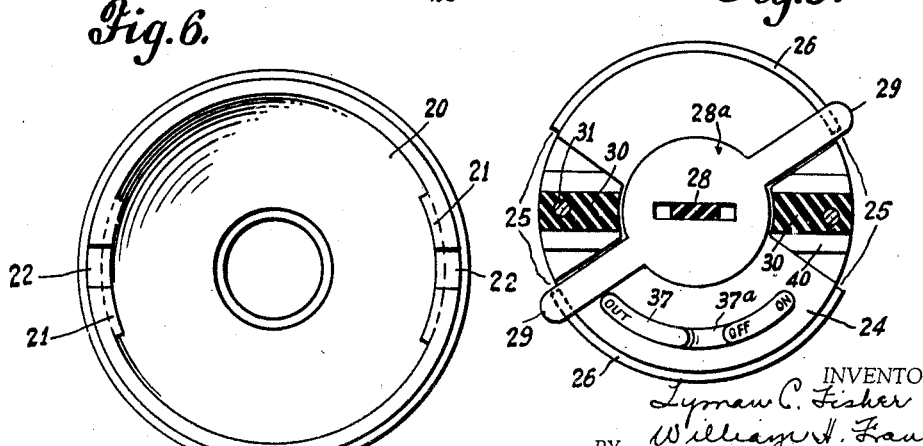
INVENTORS
Lyman C. Fisher &
William H. Frank
BY Daniel J. Cullen
ATTORNEY.

Patented Nov. 1, 1938

2,134,753

UNITED STATES PATENT OFFICE 2,134,753

DETACHABLE COLLECTOR

Lyman C. Fisher and William H. Frank, Detroit, Mich.

Application September 18, 1935, Serial No. 41,048
Renewed January 8, 1938

23 Claims. (Cl. 173—328)

This application relates to detachable collectors or connectors suitable for use with slotted tubular bus duct of the character shown in a copending application Serial No. 20,114, filed May 6, 1935, entitled Methods of making bus duct which became Patent Number 2,088,106 dated July 27, 1937.

The principal object of the present invention is to provide a compact and inexpensively made collector adapted to be associated with a slotted tubular bus duct at any point of the latter by insertion of its contacts through the slot, despite the fact that the slot is much narrower than the distance between the contacts of the collector, when these are separated to engage the spaced parallel bus bars of the duct.

For an understanding of the invention reference should be had to the description which follows and to the appended drawings. In these drawings, Figs. 1 and 2 are end views of a terminal type collector of the invention, shown in the duct in inserted (on) and insertable (out) positions, respectively.

Figs. 3 and 4 are top plan views corresponding to Figs. 1 and 2.

Fig. 5 is a cutaway top plan view of a plate or contact carrier part of the collector, as if on line 5—5, Fig. 8.

Fig. 6 is a top plan view of a cap or rotary contact spreader of the collector.

Fig. 7 is a bottom plan view of a plate or contact carrier part of the collector.

Fig. 8 is a cutaway elevation view of the collector.

Figure 1:
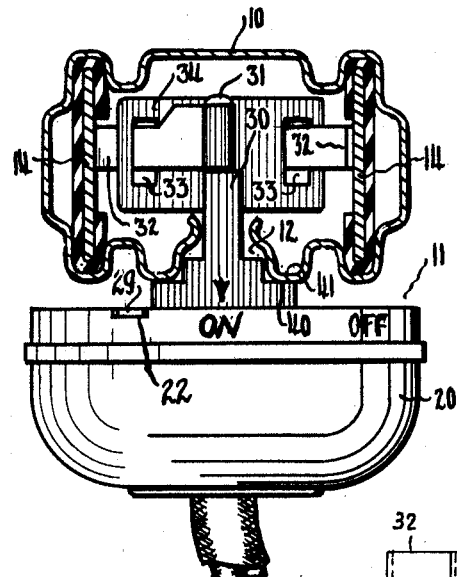
Figure 2:
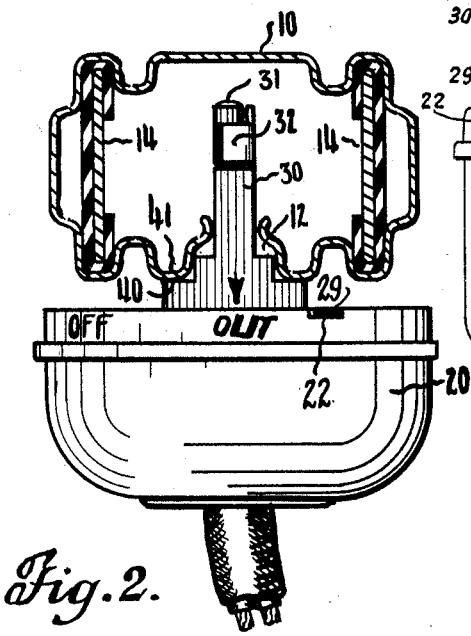

Referring to Figs. 1-8 of the drawings, it will be seen that the slotted tubular duct 10 with which the collector, referenced generally 11, is to be associated, has an elongated continuous slot 12 in its bottom wall on opposite sides of which are bus bars 14 whose exposed stripes are to be engaged by separated contacts of the connector.

The collector itself comprises a cap or rotary contact spreader part 20 of insulation whose margin is provided with diametrically opposed interiorly projecting locking lugs 21 (Fig. 6) having slots 22 in their upper surfaces. Disposed within and forming a closure for the open top of the cap is a plate or contact carrier 24 also of insulation (Fig. 5), the plate having diametrically opposed notches 25 complementing the lugs 21. It is observed that when the notches are in register with the lugs the plate 24 may be withdrawn from or associated with the cap; when the notches are out of register with the lugs the plate will have its marginal portions 26, between the notches 25, disposed under the lugs 21 and be held in the cap. Normally the plate and the cap are associated and resiliently held together by means to be described, but it is understood that for purposes of assembly or repair disassociation of the plate and cap may be effected.

The plate 24 is centrally apertured and journalled within this aperture in an axially immovable manner is a post 28 of insulation on which is keyed a metal spring washer 28a provided with diametrically opposed leaf springs 29 which project beyond the edge of the plate and are dimensioned to fit within the notches 22 of the cap lugs 21.

It will be observed that when the plate and cap are associated with each other and the leaf springs 29 are in the notches 22 (Figs. 1-4), the plate and cap will be resiliently held in association with the leaf springs keying the cap and the central post to each other, the plate acting as a journal for the cap and the central post so that these may rotate around the plate. On the other hand, when the leaf springs are out of the notches 22, and engage the unslotted parts of the marginal edge of the cap, the cap may be rotated independently of the central post so that its lugs 21 may be registered with the notches 25 or with the locking portions 26 of the plate, as desired.

Projecting upwardly from the plate and diametrically opposed and aligned with the notches 25 thereof are contact supporting posts 30 from which upwardly project metallic pins 31 which form pivotal mountings for elongated contact leaves 32 of contact material such as copper; the leaves are substantially parallel and project in opposite directions from their pivotal mountings; each leaf passes through a slot 33 of a cam 34 formed as part of the central post.

It is observed that when the cap 20, and with it the central post 28 and the cam 34, are in one position, (Figs. 1-3), contact leaves 32 are forcibly directed and retained away from each other as far as possible by the inner edges of the cam slots, whereas when the cap 20, the post 28, and the cam 34 are in another position, (Figs. 2-4), the contact leaves are forcibly directed and retained together by the edge portions 35 of the cam to be as close as possible in substantially a straight and single line.

It is also to be observed that when the cam 34 and the contact leaves 32 are in their extreme position last mentioned, that is with the contact leaves as close to each other as possible, that the edge portions 35 of the cam 34 seat within bends 36 of the leaves so that the leaves and the cam 34 will occupy as little space as possible in a direction across the thickness of the cam; this is of advantage in that it enables the parts to be disposed within as narrow a slot of the duct as possible.

Since it is desirable that movement of cam 34 and post 28 from one position to the other be defined and be terminated positively and with a snap action, there has been provided, on plate 24, a raised arcuate rail 37 which terminates short of the extreme positions of spring leaf 29 keyed to cam 34. The gaps between the ends of the rail and the contact supporting posts 30 of the plate 24 define the limits of movement of the leaf 29 and the cam 34 and the dropping of leaf 29 off the rail at its ends provides the snap action desired.

Switching

If desired, the rail 37 may be provided, between its ends, with a notch 37a into which may drop a leaf 29 to define a position in which the contact leaves 32, though spread apart sufficiently to prevent removal of the collector from the duct, will be remote from the bus bars 14 and out of engagement therewith. By rotating cap 20 so that leaf 29 moves from notch 37a to the right end of rail 37 (Fig. 3), and back, snap switching action may be effected, to make or break contact, all without removing the collector from the duct.

On the under side of the plate 24 are binding screws 38 threaded into terminals 38a integral with the contact mounting pins 31 whereby terminals of conductors passed through the central aperture 39 of the cap may be electrically and physically connected to the contact leaves 32; the terminals and binding means are contained within the enclosed space between the cap 20 and the plate 24 and are thus shielded.

Operation

When the collector is to be associated with a duct, the cap 20 and the parts keyed thereto, namely post 28, leaves 29, and cam 34 are positioned with respect to the plate 24 so that the contact leaves 32 are as close together as possible; then the contact leaves, the cam and the contact supporting posts 30 are thrust into the duct through the slot thereof until the lower stops 40 of the posts abut against beads 41 of the duct bottom. Thereafter, the cap 20 may be grasped from the outside and rotated with respect to the plate 24, which is held against rotation by the engagement of the contact supporting posts 30 with the edges of the slot of the duct; rotation of the cap 20 causes rotation of the cam 34 and spreads the contact leaves 32 so that these engage the exposed stripes of the bus bars. The proportions of the parts are such that such engagement causes a friction or clamp lock between the collector and the duct with the contact leaves 32 in contact making position; this alone, or as supplemented by the engagement of the lower edges of cam 34 with the edges of the duct slot will prevent the collector from dropping out of the duct.

It is observed that the marginal edge of the cap is spaced axially from the stop 40 a considerable distance so that the collector may be associated with the duct at any point thereof, even at points where there are coupler sleeves, doors, etc., in the bottom wall of the duct.

It is also observed that when the collector has its parts in contact making position that the camming plate forms a transverse barrier in the duct as well as a spreader, and insures adequate clearance between the contact leaves.

If desired, the contact leaves 32 may be provided with rollers thereon, so that the collector may be rolled along the duct, as a trolley; in such a case, the upper and lower edges of the cam may be relied upon to restrain up and down movement of the collector in the duct and for this purpose may be provided with horizontally axled rollers; and the side edges of contact supporting posts 30 may be relied upon to restrain sidewise shifting of the collector in the duct and for this purpose may be provided with vertically axled rollers.

Modification

Figure 9:
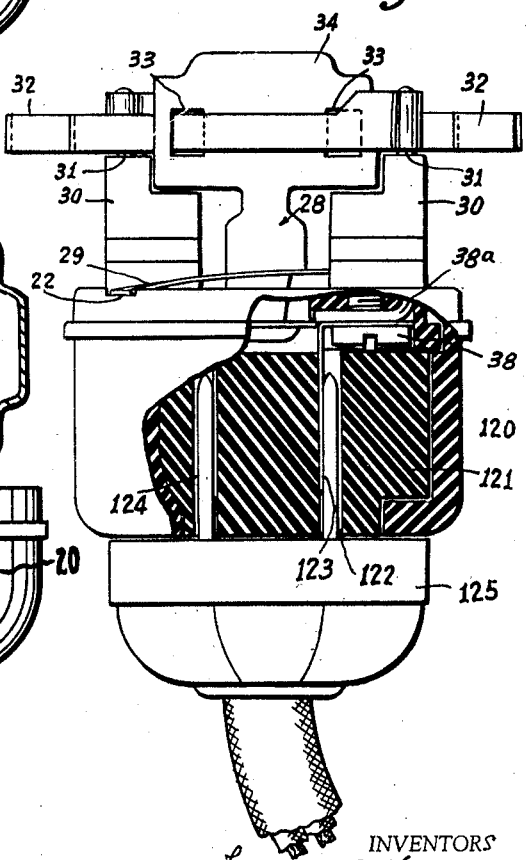
Fig. 9 shows a modification wherein the collector is in the nature of a receptacle for a cap plug.

The collector of Figs. 1–8 is shown as of the cord terminal type; if desired, it may be formed as a receptacle (Fig. 9) in which case the cap 120 will have disposed therein, in a manner so as to be rotatable therein, an insulation block 121 having slots 122 for the reception of contacts 123 physically and electrically connected to the terminals integral with the contact supporting pins 31 by the binding screws 38, which contacts 123 may be engaged by prongs 124 of a cap plug 125 entered into the slots 122.

We claim:

1. A detachable collector for use with tubular bus duct whose bottom wall is provided with a narrow slot on opposite sides of which are laterally spaced bus bars to be engaged by contacts of the collector comprising a carrier, contacts on the carrier in the form of elongated strips disposed alongside each other, and means separate from the carrier and having a portion insertable into the duct through the slot and operatively connected to the contacts and so mounted as to be manually movable with respect to the carrier, for controlling the relative position of the contacts, these, in one position, being sufficiently separated to engage the bus bars, and in another position, sufficiently drawn towards each other to be insertable into the duct through the slot, the means having a portion which remains outside of the duct when the first mentioned portion is inserted into the duct whereby manipulation of the first mentioned portion may be effected from outside the duct, carrier and the means being physically associated and movably interconnected to form a unitary collector.

2. A detachable collector for use with tubular bus duct whose bottom wall is provided with a narrow slot on opposite sides of which are laterally spaced bus bars to be engaged by contacts of the collector comprising a carrier, contacts on the carrier in the form of elongated strips disposed alongside each other, and means separate from the carrier and having a portion insertable into the duct through the slot and operatively connected to the contacts and so mounted as to be manually movable with respect to the carrier, for controlling the relative position of the contacts, these, in one position, being sufficiently separated to engage the bus bars, and in another position, sufficiently drawn towards each other to be insertable into the duct through the slot, the means having a portion which remains outside of the duct when the first mentioned portion is inserted into the duct whereby manipulation of the first mentioned portion may be effected from outside the duct, the carrier and the means being physically associated and movably interconnected to form a unitary collector, the two portions of the means being journalled on the carrier so that manipulation of the means is accomplished by rotation of the second mentioned portion of the means.

3. A detachable collector comprising a carrier having spaced aligned posts projecting upwardly therefrom, parallel contact leaves pivotally connected to the posts on axes parallel to those of the posts and extending from their pivotal mountings in opposite directions transverse to the axes of their pivotal mountings, a cam between the posts and projecting upwardly from the carrier and journalled with respect thereto and operatively connected to the contact leaves so as to control their relative position, these, in one position, being spread apart a considerable distance when the cam is rotated in one direction, and when in another position drawn close together when the cam is rotated in the opposite direction.

4. A detachable collector comprising a carrier having spaced aligned posts projecting upwardly therefrom, parallel contact leaves pivotally connected to the posts on axes parallel to those of the posts and extending from their pivotal mountings in opposite directions transverse to the axes of their pivotal mountings, a cam between the posts and projecting upwardly from the carrier and journalled with respect thereto and operatively connected to the contact leaves so as to control their relative position, these, in one position, being spread apart a considerable distance when the cam is rotated in one direction, and when in another position drawn close together when the cam is rotated in the opposite direction, and means below the carrier and keyed to the cam so as to form a manipulating handle for the cam.

5. A detachable collector comprising a carrier having spaced aligned posts projecting upwardly therefrom, parallel contact leaves pivotally connected to the posts on axes parallel to those of the posts and extending from their pivotal mountings in opposite directions transverse to the axes of their pivotal mountings, a cam between the posts and projecting upwardly from the carrier and journalled with respect thereto and operatively connected to the contact leaves so as to control their relative position, these, in one position, being spread apart a considerable distance when the cam is rotated in one direction, and when in another position drawn close together when the cam is rotated in the opposite direction, and means below the carrier and keyed to the cam so as to form a manipulating handle for the cam, and forming with it an enclosed or shielded space in which may be disposed connections between branch circuit conductor terminals and the contact leaves.

6. A detachable collector comprising a carrier having spaced aligned posts projecting upwardly therefrom, parallel contact leaves pivotally connected to the posts on axes parallel to those of the posts and extending from their pivotal mountings in opposite directions transverse to the axes of their pivotal mountings, a cam between the posts and projecting upwardly from the carrier and journalled with respect thereto and operatively connected to the contact leaves so as to control their relative position, these, in one position, being spread apart a considerable distance when the cam is rotated in one direction, and when in another position drawn close together when the cam is rotated in the opposite direction, and means below the carrier and keyed to the cam so as to form a manipulating handle for the cam, the means and the carrier being rotatably and detachably interlocked, with one part being in the nature of a container and the other part forming a container closure.

7. A detachable collector for use with tubular duct one of whose walls is provided with a narrow slot on opposite sides of which are laterally spaced surfaces to be engaged by engaging parts of the collector, the spacing of the surfaces exceeding the width of the slot, comprising a carrier, parts on the carrier in the form of elongated strips disposed alongside each other, and means separate from the carrier and having a portion insertable into the duct through the slot and operatively connected to the parts and so mounted as to be manually movable with respect to the carrier for controlling the relative position of the parts, these, in one position, being sufficiently separated to engage the duct surfaces aforementioned, and, in another position, sufficiently drawn towards each other to be insertable into the duct through the slot, the means having a portion which remains outside of the duct when the first mentioned portion is inserted into the duct whereby manipulation of the first mentioned portion may be effected from outside the duct, the carrier and the means being physically associated and movably interconnected to form a unitary collector, the collector being supported in the duct by the disposition of the slotted wall of the duct between the carrier and the means.

8. A detachable collector for use with tubular duct one of whose walls is provided with a narrow slot on opposite sides of which are laterally spaced surfaces to be engaged by engaging parts of the collector, the spacing of the surfaces exceeding the width of the slot, comprising a carrier, parts on the carrier in the form of elongated strips disposed alongside each other, and means separate from the carrier and having a portion insertable into the duct through the slot and operatively connected to the parts and so mounted as to be manually movable with respect to the carrier for controlling the relative position of the parts, these, in one position, being sufficiently separated to engage the duct surfaces aforementioned, and, in another position, sufficiently drawn towards each other to be insertable into the duct through the slot, the means having a portion which remains outside of the duct when the first mentioned portion is inserted into the duct whereby manipulation of the first mentioned portion may be effected from outside the duct, the carrier and the means being physically associated and movably interconnected to form a unitary collector, the means supporting the collector from the duct when suspended therefrom with the slotted wall thereof forming the bottom thereof.

9. A detachable collector for use with tubular bus duct whose bottom wall is provided with a narrow slot on opposite sides of which are laterally spaced bus bars to be engaged by contacts of the collector comprising a carrier, contacts on the carrier in the form of elongated strips disposed alongside each other, and means separate from the carrier and having a portion insertable into the duct through the slot and operatively connected to the contacts and so mounted as to be manually movable with respect to the carrier for controlling the relative position of the contacts, these, in one position, being sufficiently separated to engage the bus bars, and in another position, sufficiently drawn towards each other to be insertable into the duct through the slot, the means having a portion which remains outside of the duct when the first mentioned portion is inserted into the duct whereby manipulation of the first mentioned portion may be effected from outside the duct, the carrier and the means being physically associated and movably interconnected to form a unitary collector, the collector being supported in the duct by the disposition of the slotted wall of the duct between the carrier and the means.

10. A detachable collector for use with tubular bus duct whose bottom wall is provided with a narrow slot on opposite sides of which are laterally spaced bus bars to be engaged by contacts of the collector comprising a carrier, contacts on the carrier in the form of elongated strips disposed alongside each other, and means separate from the carrier and having a portion insertable into the duct through the slot and operatively connected to the contacts and so mounted as to be manually movable with respect to the carrier for controlling the relative position of the contacts, these, in one position, being sufficiently separated to engage the bus bars, and in another position, sufficiently drawn towards each other to be insertable into the duct through the slot, the means having a portion which remains outside of the duct when the first mentioned portion is inserted into the duct whereby manipulation of the first mentioned portion may be effected from outside the duct, the carrier and the means being physically associated and movably interconnected to form a unitary collector, the means supporting the collector from the duct when suspended therefrom with the slotted wall thereof forming the bottom thereof.

11. A detachable collector for use with tubular duct one of whose walls is provided with a narrow slot on opposite sides of which are laterally spaced surfaces to be engaged by engaging parts of the collector, the spacing of the surfaces exceeding the width of the slot, comprising a carrier, parts on the carrier in the form of elongated strips disposed alongside each other, and means separate from the carrier and having a portion insertable into the duct through the slot and operatively connected to the parts and so mounted as to be manually movable with respect to the carrier for controlling the relative position of the parts, these, in one position, being sufficiently separated to engage the duct surfaces aforementioned, and, in another position, sufficiently drawn towards each other to be insertable into the duct through the slot, the means having a portion which remains outside of the duct when the first mentioned portion is inserted into the duct whereby manipulation of the first mentioned portion may be effected from outside the duct, the carrier and the means being physically associated and movably interconnected to form a unitary collector.

12. A detachable collector for use with tubular bus duct whose bottom wall is provided with a narrow slot on opposite sides of which are laterally spaced bus bars to be engaged by contacts of the collector comprising a carrier for the contacts, and means separate from the carrier and having a portion insertable into the duct through the slot and operatively connected to the contacts and so mounted as to be manually movable with respect to the carrier for controlling the relative position of the contacts, these, in one position, being sufficiently separated to engage the bus bars, and in another position, sufficiently drawn towards each other to be insertable into the duct through the slot, the means having a portion which remains outside of the duct when the first mentioned portion is inserted into the duct whereby manipulation of the first mentioned portion may be effected from outside the duct, the carrier and the means being physically associated and movably interconnected to form a unitary collector, the carrier and the means aforesaid having cooperating formations which cooperate to index the means to the carrier in any one of three positions, in one of which the contacts are separated to engage the bus bars, in one of which the contacts are close together to be free of the bus bars and permit their insertion into or their withdrawal from the duct, and in an intermediate one of which the contacts are close enough together to be free of the bus bars but are so separated as to prevent their withdrawal from the duct.

13. A detachable collector for use with tubular duct one of whose walls is provided with a narrow slot on opposite sides of which are laterally spaced surfaces to be engaged by engaging parts of the collector, the spacing of the surfaces exceeding the width of the slot, comprising a carrier for the parts, and means separate from the carrier and having a portion insertable into the duct through the slot and operatively connected to the parts and so mounted as to be manually movable with respect to the carrier for controlling the relative position of the parts, these, in one position, being sufficiently separated to engage the duct surfaces aforementioned, and, in another position, sufficiently drawn towards each other to be insertable into the duct through the slot, the means having a portion which remains outside of the duct when the first mentioned portion is inserted into the duct whereby manipulation of the first mentioned portion may be effected from outside the duct, the carrier and the means being physically associated and movably interconnected to form a unitary collector, the two portions of the means being separate and so formed that the portion of the means outside of the duct forms a cup closed by the carrier which in turn forms a plate-bearing for the duct-received portion of the means.

14. A detachable collector for use with tubular duct one of whose walls is provided with a narrow slot on opposite sides of which are laterally spaced surfaces to be engaged by engaging parts of the collector, the spacing of the surfaces exceeding the width of the slot, comprising a carrier for the parts, and means separate from the carrier and having a portion insertable into the duct through the slot and operatively connected to the parts and so mounted as to be manually movable with respect to the carrier for controlling the relative position of the parts, these, in one position, being sufficiently separated to engage the duct surfaces aforementioned, and, in another position, sufficiently drawn towards each other to be insertable into the duct through the slot, the means having a portion which remains outside of the duct when the first mentioned portion is inserted into the duct whereby manipulation of the first mentioned portion may be effected from outside the duct, the carrier and the means being physically associated and movably interconnected to form a unitary collector, the two portions of the means being separate and so formed that the portion of the means outside of the duct forms a cup closed by the carrier which in turn forms a plate-bearing for the duct-received portion of the means, and formations on the cup and the plate for detachably interlocking and intersecuring them mutually.

15. A detachable collector for use with tubular duct one of whose walls is provided with a narrow slot on opposite sides of which are laterally spaced surfaces to be engaged by engaging parts of the collector, the spacing of the surfaces exceeding the width of the slot, comprising a carrier for the parts, and means separate from the carrier and having a portion insertable into the duct through the slot and operatively connected to the parts and so mounted as to be manually movable with respect to the carrier for controlling the relative position of the parts, these, in one position, being sufficiently separated to engage the duct surfaces aforementioned, and, in another position, sufficiently drawn towards each other to be insertable into the duct through the slot, the means having a portion which remains outside of the duct when the first mentioned portion is inserted into the duct whereby manipulation of the first mentioned portion may be effected from outside the duct, the carrier and the means being physically associated and movably interconnected to form a unitary collector, the two portions of the means being separate and so formed that the portion of the means outside of the duct forms a cup closed by the carrier which in turn forms a plate-bearing for the duct received portion of the means, and formations on the cup and the plate for detachably interlocking and intersecuring them mutually, and resilient means for restraining relative separation of the cup and plate.

16. A detachable collector for use with tubular elongated duct one of whose walls is provided with a narrow elongated slot on opposite sides of which are laterally spaced elongated bus bars to be engaged by contacts of the collector, the spacing of the bus bars exceeding the width of the slot, comprising a carrier, elongated contact leaves mounted thereon and insertable into the duct through the slot and extendng from their mounting points in a direction transverse to the direction in which they are inserted into the slot, means normally holding the leaves together so that their aggregate spread is less than the width of the slot whereby they may be inserted into the duct through the slot, the means being manipulable outside the duct and after the leaves have been inserted thereinto to cause the leaves to separate and move towards and engage the bus bars, such movement of the leaves being in paths transverse to the direction of their insertion into the slot and transverse to the direction in which they extend from their mounting points when they are being inserted into the duct through the slot.

17. A detachable collector for use with tubular elongated duct one of whose walls is provided with a narrow elongated slot on opposite sides of which are laterally spaced elongated bus bars to be engaged by contacts of the collector, the spacing of the bus bars exceeding the width of the slot, comprising a carrier, elongated contact leaves mounted thereon and insertable into the duct through the slot and extending from their mounting points in a direction transverse to the direction in which they are inserted into the slot, means normally holding the leaves together so that their aggregate spread is less than the width of the slot whereby they may be inserted into the duct through the slot, the means being manipulable outside the duct and after the leaves have been inserted thereinto to cause the leaves to separate and move towards and engage the bus bars, such movement of the leaves being in paths transverse to the direction of their insertion into the slot and transverse to the direction in which they extend from their mounting points when they are being inserted into the duct through the slot, and conductors connected to said leaves through their mounting points.

18. A detachable collector for use with tubular duct one of whose walls is provided with a narrow slot on opposite sides of which are laterally spaced surfaces to be engaged by engaging parts of the collector, the spacing of the surfaces exceeding the width of the slot, comprising a carrier for the parts, and means separate from the carrier and having a portion insertable into the duct through the slot and operatively connected to the parts and so mounted as to be manually movable with respect to the carrier for controlling the relative position of the parts, separated to engage the bus bars, or drawn towards each other to be insertable into the duct through the slot, the means having a portion which remains outside of the duct when the first mentioned portion is inserted into the duct whereby manipulation of the first mentioned portion may be effected from outside the duct, the carrier and the means being physically associated and movably interconnected to form a unitary collector, the two portions of the means being separate and so formed that the portion of the means outside of the duct forms a cup closed by the carrier which in turn forms a plate-bearing for the duct-received portion of the means, the two portions of the means being journalled on the carrier so that manipulation of the means is accomplished by rotation of the second mentioned portion of the means.

19. A detachable collector comprising a carrier having spaced aligned posts projecting upwardly therefrom, parallel contact leaves pivotally connected to the posts on axes parallel to those of the posts and extending from their pivotal mountings in opposite directions transverse to the axes of their pivotal mountings, a cam between the posts and projecting upwardly from the carrier and journalled with respect thereto and operatively connected to the contact leaves so as to control their relative position, spread apart when the cam is rotated in one direction, and drawn together when the cam is rotated in the opposite direction, and means below the carrier and keyed to the cam so as to form a manipulating handle for the cam, the means and the cam being detachably interlocked, and with the means forming a journal for the carrier which in turn forms a support for the cam.

20. A detachable collector for use with tubular duct one of whose walls is provided with a narrow slot on opposite sides of which are laterally spaced surfaces to be engaged by engaging parts of the collector, the spacing of the surfaces exceeding the width of the slot, comprising a carrier for the parts, and means separate from the carrier and having a portion insertable into the duct through the slot and operatively connected to the parts and so mounted as to be manually movable with respect to the carrier for controlling the relative position of the parts, separated to engage the bus bars, or drawn towards each other to be insertable into the duct through the slot, and means having a portion which remains outside of the duct when the first mentioned portion is inserted into the duct whereby manipulation of the first mentioned portion may be effected from outside the duct, the carrier and the means being physically associated and movably interconnected to form a unitary collector, the two portions of the means being separate and so formed that the portion of the means outside of the duct forms a cup closed by the carrier which in turn forms a plate-bearing for the duct-received portion of the means, the two portions of the means being journalled on the carrier so that manipulation of the means is accomplished by rotation of the second mentioned portion of the means, and a resilient element resiliently holding the first mentioned portion of the means and the carrier in assembly, relatively rotatable, and interlocking the two portions of the means so that they rotate together around the carrier, and also holding the means and the carrier in assembly, relatively rotatable.

21. A detachable collector comprising a carrier having aligned posts projecting upwardly therefrom, parallel contact leaves pivotally connected to the posts on axes parallel to those of the posts and extending from their pivotal mountings in opposite directions transverse to the axes of their pivotal mountings, a cam between the posts and projecting upwardly from the carrier and journalled with respect thereto and operatively connected to the contact leaves so as to control their relative position, spread apart when the cam is rotated in one direction, and drawn together when the cam is rotated in the opposite direction, and means below the carrier and keyed to the cam so as to form a manipulating handle for the cam, the means and the cam being detachably interlocked, and with the means forming a journal for the carrier which in turn forms a support for the cam, and a resilient element resiliently holding the cam and the carrier in assembly, relatively rotatable, and interlocking the cam and the means to rotate together around the carrier, and also holding the means, the cam, and the carrier in assembly, with the means and the cam not relatively rotatable and with the means-cam and the carrier relatively rotatable.

22. A detachable collector for use with tubular bus duct whose bottom wall is provided with a narrow slot on opposite sides of which are laterally spaced bus bars to be engaged by contacts of the collector comprising a carrier, contacts on the carrier in the form of elongated strips disposed alongside each other, and means separate from the carrier and having a portion insertable into the duct through the slot and operatively connected to the contacts and so mounted as to be manually movable with respect to the carrier for controlling the relative position of the contacts, these, in one position, being sufficiently separated to engage the bus bars, and in another position, sufficiently drawn towards each other to be insertable into the duct through the slot, and means having a portion which remains outside of the duct when the first mentioned portion is inserted into the duct whereby manipulation of the first mentioned portion may be effected from outside the duct, the carrier and the means being physically associated and movably interconnected to form a unitary collector, the first mentioned portion being so proportioned that it straddles the slot when the contacts are separated, whereby said portion interlocks the collector to the duct.

23. A detachable collector for use with tubular duct one of whose walls is provided with a narrow slot on opposite sides of which are laterally spaced surfaces to be engaged by engaging parts of the collector, the spacing of the surfaces exceeding the width of the slot, comprising a carrier, parts on the carrier in the form of elongated strips disposed alongside each other, and means separate from the carrier and having a portion insertable into the duct through the slot and operatively connected to the parts and so mounted as to be manually movable with respect to the carrier for controlling the relative position of the parts, these, in one position, being sufficiently separated to engage the duct surfaces aforementioned, and, in another position, sufficiently drawn towards each other to be insertable into the duct through the slot, the means having a portion which remains outside of the duct when the first mentioned portion is inserted into the duct whereby manipulation of the first mentioned portion may be effected from outside the duct, the carrier and the means being physically associated and movably interconnected to form a unitary collector, the collector being supported in the duct by the disposition of the slotted wall of the duct between the carrier and the means, the first mentioned portion being so proportioned that it straddles the slot when the aforementioned parts are separated, whereby said portion interlocks the collector to the duct.

LYMAN C. FISHER.
WILLIAM H. FRANK.